United States Patent [19]

Nulman et al.

[11] Patent Number: 5,618,599
[45] Date of Patent: Apr. 8, 1997

[54] MULTI-LAYER MOLDED POLYMER COMPOSITIONS

[75] Inventors: Mark Nulman, West Bloomfield; Rose A. Ryntz, Clinton Twp., both of Mich.

[73] Assignee: Ford Motor Company, Dearborn, Mich.

[21] Appl. No.: 601,811

[22] Filed: Feb. 15, 1996

[51] Int. Cl.$^6$ .............................. B32B 27/32; B32B 1/02; B65D 65/40
[52] U.S. Cl. ...................... 428/36.7; 525/57; 206/524.2; 220/415; 220/453; 220/468
[58] Field of Search ................ 428/36.7; 206/524.2; 220/415, 453, 468

[56] References Cited

U.S. PATENT DOCUMENTS

| | | | |
|---|---|---|---|
| 4,254,169 | 3/1981 | Schroeder | 428/36.7 |
| 4,555,546 | 11/1985 | Patel | 525/194 |
| 4,657,970 | 4/1987 | Shiraki et al. | 525/57 |
| 4,973,625 | 11/1990 | Deyrup | 525/74 |
| 5,035,933 | 7/1991 | Ilenda | 428/36.7 |
| 5,061,751 | 10/1991 | Patton | 525/57 |
| 5,084,352 | 1/1992 | Percec | 428/412 |
| 5,260,371 | 11/1993 | Chen | 525/60 |
| 5,321,088 | 6/1994 | Schwab | 525/186 |
| 5,356,990 | 10/1994 | Pucci | 525/57 |
| 5,416,162 | 5/1995 | Gore et al. | 525/79 |
| 5,425,470 | 6/1995 | Duhaime | 428/36.7 |

FOREIGN PATENT DOCUMENTS

| 134947 | 5/1994 | Japan | 428/36.7 |
|---|---|---|---|

OTHER PUBLICATIONS

T. C. Chung and D. Rhubright, Macromolecules 1994 13313–1319, Department of Materials Science and Engineering, The Pennsylvania State University, University Park, Pennsylvania 16802.

*Primary Examiner*—David Buttner
*Attorney, Agent, or Firm*—Damian Porcari

[57] ABSTRACT

A multi-layer molded polymer composition comprising a polyolefin layer and a immiscible polymer layer adjacent the polyolefin layer. The immiscible polymer layer is selected from a polymer that is normally immiscible for the polyolefin layer. A compatibilizer is blended into either the polyolefin layer or the immiscible polymer layer or optionally into both layers. The compatibilizer has a polyolefin backbone that is miscible in the polyolefin layer and one or more functional polymer grafts attached to the compatibilizer polyolefin backbone. The functional polymer grafts are miscible in the immiscible polymer layer whereby the compatibilizer bonds with both the polyolefin layer and the immiscible polymer layer.

2 Claims, 1 Drawing Sheet

MULTI-LAYER MOLDED POLYMER COMPOSITIONS

BACKGROUND OF THE INVENTION

1. Field of the Invention

The present invention relates to multi-layer molded polymer compositions and their methods of manufacture. More specifically, the invention relates to multi-layer polymer compositions having a first polyolefin layer and a second polymer layer made of dissimilar and immiscible materials joined together using a compatibilizer.

2. Description of the Related Art

It is useful to manufacture containers, films, tubing and packaging from multi-layer materials. The different materials provide different properties. By combining these different materials, the final product will have the benefits of materials in the individual layers. Unfortunately, materials that provide unique physical properties often do not adhere well to other materials having other different physical properties. In these cases, an intermediate adhesive layer is used to join the dissimilar materials. The need for an adhesive increases the cost and complexity of fabricating the multi-layer compositions.

One example of this can be seen in the manufacture of packaging and containers having permeation resistant qualities. U.S. Pat. No. 4,973,625 teaches a method of manufacturing composite structures having an oxygen barrier intermediate various high density polyethylene layers (HDPE). The oxygen barrier is made from ethylene vinyl alcohol (EVOH). EVOH is generally immiscible in HDPE and visa versa. EVOH does not adhere well to the HDPE and therefore may not be co-extruded directly against the HDPE layer. The U.S. Pat. No. 4,973,625 patent teaches the use of intermediate bonding resin to unite the multi-layer structure. In this example, a melt-extrudable bonding resin of amorphous polycarboxylamide serves as a tie layer between the HDPE and EVOH. A similar construction has been used in the manufacture of blow molded fuel tanks to provide permeation resistance to low molecular hydrocarbons. Unfortunately, this construction requires the extrusion of intermediate tie layers between the polyolefin layer and the barrier layer. When used in blow molded fuel tanks, five or more separate extruders are needed to make the multi-layer fuel tank wall. Two or more extruders may be eliminated if the intermediate adhesive layer between the polyolefin and barrier layer is eliminated. Therefore, it is an object of the present invention to provide a composition for manufacturing multi-layer molded polymer articles using dissimilar materials without the need for an intermediate adhesive tie layer.

SUMMARY OF THE INVENTION

The present invention is directed to a multi-layer molded polymer composition comprising a polyolefin layer and a immiscible polymer layer adjacent the polyolefin layer. The immiscible polymer layer is selected from a polymer that is normally immiscible for the polyolefin layer. A compatibilizer is blended into either the polyolefin layer or the immiscible polymer layer or optionally into both layers. The compatibilizer has a polyolefin backbone that is miscible in the polyolefin layer and one or more functional polymer grafts attached to the compatibilizer polyolefin backbone. The functional polymer grafts are miscible in the immiscible polymer layer whereby the compatibilizer bonds with both the polyolefin layer and the immiscible polymer layer. While the present invention may be used in a variety of molding methods including co-injection molding, multi-layer extrusion molding and multi-layer blow molding, it is particularly useful in the manufacture of multi-layer blow molded fuel tanks having an intermediate polymer barrier layer between two or more polyolefin layers. The barrier layer is made from a polymer, usually EVOH, which is generally immiscible in the polyolefin, usually HDPE. By blending the compatibilizer into either the polyolefin layer or the barrier layer or both, a multi-layer fuel tank having an intermediate barrier layer which is immiscible in the polyolefin layer may be fabricated without the need for an intermediate adhesive tie layer.

DETAILED DESCRIPTION OF THE PREFERRED EMBODIMENTS

Figure 1:
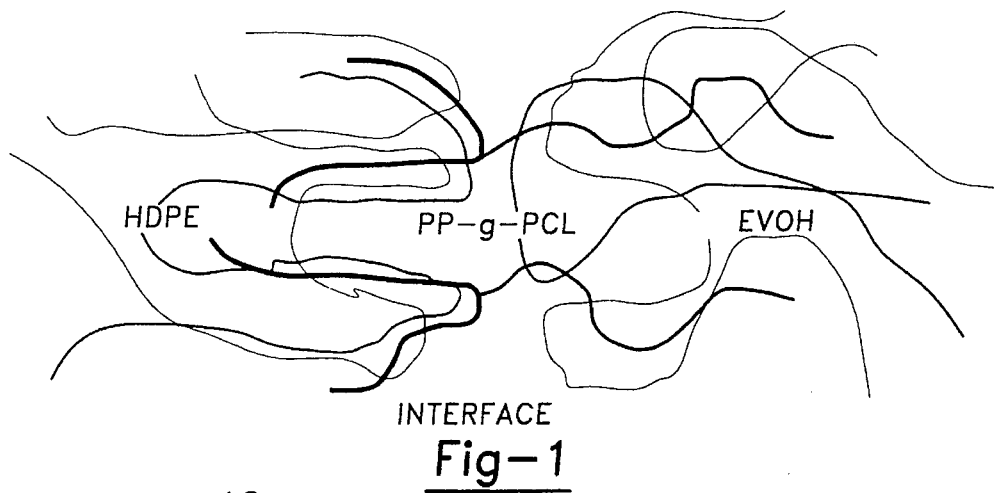
FIG. 1 illustrates the molecular entanglement of the compatibilizer between the polyolefin and immiscible layers.

The present invention is directed to the use of compatibilizers to improve the cohesiveness between layers of molded plastics made from normally immiscible materials. Use of the compatibilizer in this way allows the manufacture of multi-layer composite structures without the need for intermediate adhesive or tie layers.

The invention will be illustrated through the use of polypropylene and polyethylene based compatibilizers. Other polyolefin based compatibilizers are also useful in the present inventions and maybe substituted for the polypropylene and polyethylene backbones discussed herein. Alternative polyolefin materials may also be used for in the compatibilizer backbone including: poly(isobuylene), poly(ethylene-propylene) copolymer, poly(ethylene-butene) copolymer, poly(ethylene-hexene)copolymer, or poly(ethylene-octene) copolymer.

Compatibilizers useful in the present invention contain a polyolefin backbone with one or more functional polymer grafts. The polyolefin backbone is selected from a class of materials that is generally miscible in the polyolefin material making up the polyolefin layer. The functional polymer grafts are selected from a group of materials generally miscible in the immiscible polymer making up the immiscible polymer layer. The compatibilizer serves to mechanically and chemically bond to both layers at the interface and unite the two dissimilar materials. The synthesis of these types of compatibilizers has been described in a paper titled *"Polypropylene-Graft-Polycaprolactone: Synthesis and Applications in Polymer Blends"*, T. C. Chung and D. Rhubright, Macromolecules 1994, Vol. 27, pages 1313–1319, and incorporated herein by reference. The polyolefin, in this case, polypropylene (PP) is hydroxylated to contain primary or secondary alcohol groups. The hydroxylated polypropylene (PP-OH) is reacted with a borane containing polymer using a Ziegler-Natta catalyst. The reaction is described in the equation shown below.

The boranes monomers, ω-alkenylboranes, were copolymerized with polypropylene using the Ziegler-Natta catalyst. Due to the excellent stability and solubility of the borane functional group and the polymerization conditions, high molecular weight borone-containing polypropylene (I) with a molecular weight of more than 300,000 grams per mole were obtained. The polymerization reactions are very efficient and obtain high yields within short reaction times. Borone-containing polypropylene (I) acts as a polymeric free radical source under oxidation conditions, which initiate free radical grafts from copolymerization. This chemistry can be applied to most free radical polymerizable monomers, such as methylmethacrylate (MMA) and vinylacrylate (VAc) monomers to form a series of polypropylene graft copolymers with a polypropylene backbone and several free radical prepared polymers, such as polymethylmethacrlate (PMMA) and polyvinylacrylate (PVAc), bonded to the side chains. In addition, the combination of the hydroxylated polypropylene polymer (III) and anionic ring opening polymerization of epsilon-caprolactone ($\epsilon$-CL) are useful for preparing polypropylene grafted polycaprolactol copolymers (PP-g-PCL) with controllable compositions and molecular structures. Hydroxyl content (OH) controls the graft density while the $\epsilon$-CL concentration and reaction time determines the graft length. The individual polypropylene and polycaprolactol segments in the copolymers form two separate highly crystalline bases. The PP-g-PCL copolymers (IV) were shown to be good compatibilizers for composites of polypropylene and polycaprolactol, polycarbonate or polyvinylchloride.

The present invention uses compatibilizers made with this chemistry to bond dissimilar layers into a laminate structure. The reaction chemistry for manufacturing the polypropylene grafted polycaprolactol compatibilizers was primarily intended to aide in combining polyolefin with EVOH. The compatibilizer may be made to work with other materials by selecting a functional polymer graft that is miscible in the polymer layer. Other functional polymers may be grafted including:

$CH_2=CH_2$, $CH_2=CH-CH_3$, and $CH_2=CH(CH_2)_nCH_3$ where n=1, 3, or 5.

When a polyolefin is co-extruded adjacent an immiscible polymer, that is a polymer that is immiscible in the polyolefin, the resulting laminate shows little or no peel strength. The interfacial region between the polyolefin and immiscible layer experiences little or no diffusion from one material to the other. A similar result occurs with co-injection molded and compression molded materials. It is believed that weak boundary layers form as result of stresses imparted during the molding operation that can be attributed to shear, temperature fluctuations (e g., melt temperature, mold temperature, cooling rate, etc.) and polymer crystallinity. Shear strength between the polyolefin and an immiscible polymer may be greatly increased with the addition of a compatibilizer to either the polyolefin, the immiscible polymer or both.

EXAMPLE 1

A plaque of HDPE approximately 15 cm by 18 cm was compression molded. After cooling, a thin film of EVOH was placed on top of the HDPE and the composite layer was compression molded for 20 min. at 300 psi at 220° C. The composite layered structure was removed from the compression molding press and specimen strips approximately 1.2 cm by 18 cm were cut from the plaque and peel strengths were measured. The same plaques were molded but this time, after cooling, a quantity of compatabilizer was evenly distributed on top of the surface of the HDPE plaque, EVOH layer was placed on top of the compatabilizer, and the composite layer was compression molded under the same conditions. After cooling, peel strengths were measured as described above.

EXAMPLE 2

The desired amount of compatibilizer was added to EVOH in an extruder at 220° C. The EVOH and compatibilizer mixture was co-extruded with HDPE and the resultant mixture chopped into pellets. The pellets were compression molded under the conditions described in Example 1 and tested as described in Table 1.

EXAMPLE 3

The desired amount of compatabilizer was added to the liquid crystal polyester in an extruder at 280° C., and the material was extruded and cut into pellets. The pelletized material was compression molded into a plaque 15 cm by 18 cm. A poly(propylene) plaque, 15 cm by 18 cm, was placed on top of the compatibilizer/polyester plaque and the composite structure was compression molded for 20 minutes at 300 psi and 280° C. The resultant composite layered structure plaque was tested as described in Table 1.

EXAMPLE 4

The desired amount of compatibilizer was added to the poly(amide) in the extruder at 220° C. and the material was extruded and cut into pellets. The pelletized material was compression molded into a plaque 15 cm by 18 cm. A poly(ethylene) plaque (15 cm by 18 cm) was placed on top of the compatibilizer/poly(amide) plaque and the composite structure was compression molded for 20 minutes at 200 psi and 220° C. The resultant composite layered structure plaque was tested as described in Table 1.

EXAMPLE 5

The desired amount of compatabilizer was added to the poly(phenylene sulfide) in the extruder at 285° C., and the material was extruded and cut into pellets. The pelletized material was compression molded into a plaque 15 cm by 18 cm. A poly(vinylidene fluoride) plaque, 15 cm by 18 cm, was placed on top of the compatibilizer/polyester plaque and the composite structure was compression molded for 20 minutes at 300 psi and 285° C. The resultant composite layered structure plaque was tested as described in Table 1.

TABLE 1

| Major Phase | Minor Phase | Compatabilizer | wt % Compatibilizer (based on a minor phase) | Peel Strength *** (Initial) | (After Gas Immersion #) | Preparation Method |
|---|---|---|---|---|---|---|
| HDPE (1) | EVOH (2) | None | 0 | 0 | 0 | Ex. 1 |
| HDPE (1) | EVOH (2) | PP-g-PCL (3) | 3 | 0.3 | 0.255 | Ex. 1 |
| HDPE (1) | EVOH (2) | PP-g-PCL (4) | 3 | 0.5 | 0.425 | Ex. 2 |
| HDPE (1) | EVOH (2) | PE-g-PCL (5) | 3 | 0.25 | 0.213 | Ex. 2 |
| PP (6) | Liq. Crys (7) | None | 0 | 0 | 0 | Ex. 2 |
| PP (6) | Liq. Crys (7) | PP-g-PCL (4) | 5 | 0.5 | 0.425 | Ex. 3 |
| HDPE (1) | PA (8) | None | 0 | 0 | 0 | Ex. 3 |
| HDPE (1) | PA (8) | PE-g-PCLa (9) | 5 | 0.4 | 0.34 | Ex. 4 |
| PVDF (10) | PPS (11) | PE-g-PCLa (9) | 5 | 0.55 | 0.43 | Ex. 5 |
| HDPE (1) | EVOH (2) | PP-PMMA (12) | 5 | 0.45 | 0.3 | Ex. 2 |
| HDPE (1) | PA (8) | PE-PVA (13) | 5 | 0.6 | 0.45 | Ex. 2 |

\* Major phase is defined as base material, that utilized in a larger wt % or as matrix phase.
\*\* Minor phase is defined as barrier layer or that utilized in smaller wt % or as the dispersed phase in the matrix.
\*\*\* Peel strength performed according to Ford Motor Company test standard FLTM B0101-06 in kN/m.
\# Gas Immersion is defined as an immersion of composite in CE-10 (gasoline and 10% EtOH) at 40° C. after 7 day immersion.

Notes

1. HDPE density 0.94–0.96 g/cm3, mp 128° C., melt index 6 g/10 min.
2. EVOC density 1.19 g/cm3, melting point 183° C., melt index 1.6 g/10 min.
3. 2 g PP, 4.2 g functional graft ε-caprolactone, 33% by weight functional polymer graft.
4. 2 g PP, 8.2 g functional graft ε-caprolactone, 57% by weight functional polymer graft.
5. 2 g PE, 4.6 g functional graft ε-caprolactone, 60% by weight functional polymer graft.
6. PP density 0.90–0.91 g/cm3, mp 165° C., melt index 40 g/10 min.
7. Liquid crystal poly(ester) density 1.4 g/cm3, mp 280° C.
8. Poly(amide), nylon 6,6 density 1.14 g/cm3, mp 260° C., melt index 3 g/10 min.
9. 2 g PE, 4.6 g functional graft ε-caprolactone, 60% by weight functional polymer graft.
10. Poly(vinylidene fluoride) density 1.78 g/cm3, mp 178° C.
11. Poly(phenylene sulfide) density 1.3 g/cm3, mp 285° C.
12. 2 g PP, 4.6 g functional graft poly(methyl methacrylate), 60% by weight functional polymer graft.
13. 2 g PE, 4.6 g functional graft poly(vinyl alcohol), 60% by weight functional polymer graft.

The test results summarized above are a compilation of peel strengths prepared be each method described in Examples 1–3. Peel strength was not materially affected by adding the compatibilizer into either the major or minor phase or both or by placing the placing the finely ground compatibilizer directly atop the HDPE.

The cohesion mechanism between the polyolefin layer and the immiscible polymer layer is believed to be a combination of mechanical interlocking of the elongated polymer chains and dispersive bonding between the functional polymer and the immiscible layer. This mechanical entanglement is illustrated in FIG. 1. The compatibilizer is either placed between the polyolefin layer and immiscible polymer layer or preferably blended into one or both layers. Compatibilizer migrates to the surface of the layers. When the compatibilizer is mixed into the polyolefin layer, the functional polymer grafts are generally repelled by the polyolefin material and be come attracted to the adjacent immiscible layer. An opposite situation occurs if the compatibilizer is blended within the immiscible layer: the functional polymer grafts are attracted to the immiscible layer and the polyolefin backbone is repelled. The polyolefin backbone is attracted to the adjacent polyolefin layer. The compatibilizer molecules bridge the interface between the polyolefin and immiscible polymer layers.

Figure 2:
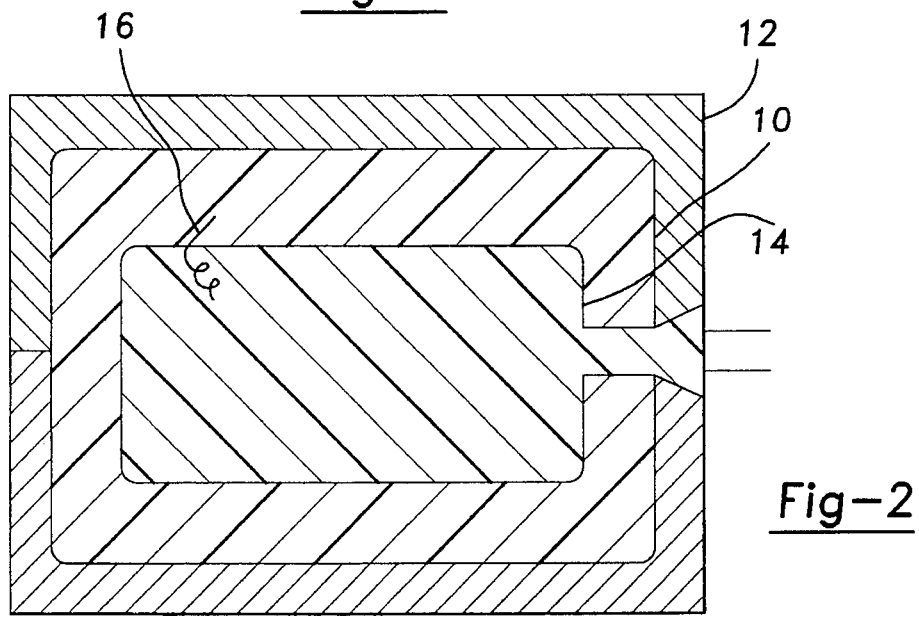
FIG. 2 illustrates the molecular entanglement of the compatibilizer at the skin-core interface of the co-injection molded substrate.

The same composition and process may be used in co-injection molding as illustrated in FIG. 2. A first layer of immiscible polymer material 10 is injected within the cavity of the mold 12. A second layer of polyolefin and compatibilizer mixture 14 is injected into the mold after the injection of the immiscible material 10. Compatibilizer molecules 16 bridge the interfacial layers between the immiscible material 10 and the polyolefin/compatibilizer mixture 14. The compatibilizer may alternatively be placed within the polyolefin or both the polyolefin and immiscible materials.

Figure 3:
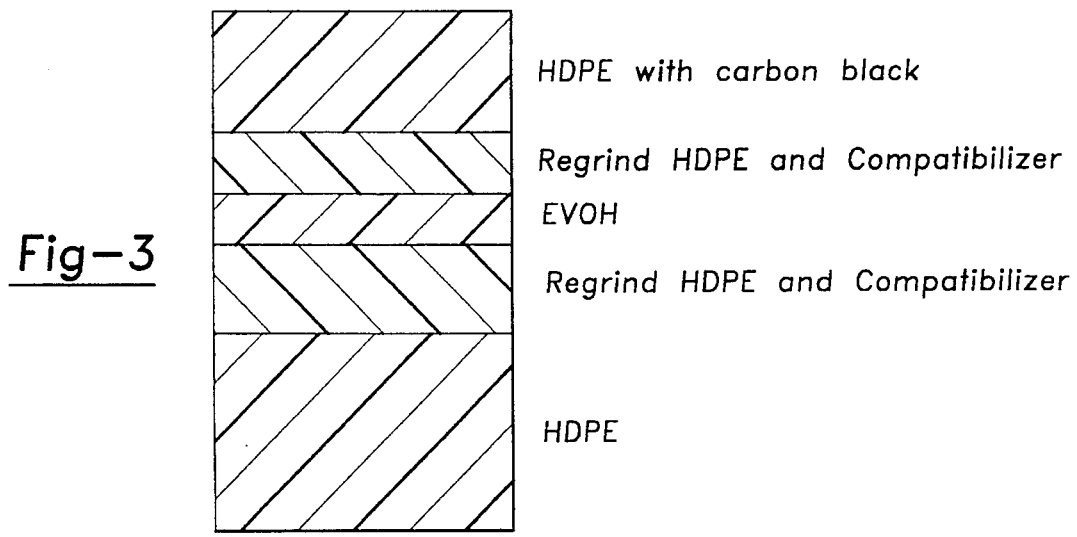
FIG. 3 is a cross,sectional view of a multi-layer blow molded fuel tank using a compatibilizer.

The invention is particularly useful in the manufacture of blow molded fuel tanks having an intermediate barrier layer of EVOH. Most automotive fuel tanks are made from HDPE. EVOH has been found useful to act as a barrier layer to low molecular weight hydrocarbons. Unfortunately, the peel strength between co-extruded HDPE and EVOH is 0. Additional adhesive tie layers were necessary to form a laminate structure. By blending a small quantity of compatibilizer into the EVOH, a co-extruded fuel tank having an EVOH layer between two layers of HDPE may be manufactured with peel strengths of 0.5 kN/m. It is generally desirable to blend the compatibilizer into the thinnest layer of the multi-layer molded composition. This uses the least amount of compatibilizer and reduces the amount of unneeded compatibilizer located wholly within one layer. Compatibilizer that does not bridge the interface between the dissimilar materials does not add to the peel strength of the laminate. Because the HDPE layer of fuel tanks is usually 25–40 times greater than the EVOH layer, it is most efficient to put the compatibilizer within the EVOH. If the fuel tank is made with two or more types of HDPE, for example the use of carbon black, virgin and regrind HDPE, compatibilizer may be blended within the thinner regrind layer as illustrated in FIG. 3.

From the foregoing description and examples, it can be seen that a compatibilizer having the polyolefin backbone with functional polymer grafts is useful in joining two or more layers of dissimilar material wherein the polymer backbone is miscible in one layer and the functional polymer grafts are miscible in the second layer. The invention may be used with a variety of molding techniques, however it is especially useful in co-injection, compression and blow molding. By using compatibilizer blended into one or more dissimilar materials, a multi-layer laminate may be fabricated without the need of a tie or adhesive layer. The invention has been described in conjunction with the specific embodiments illustrated, however, many alternatives, modifications, and variations will be apparent to those skilled in the art in light of the foregoing description. Accordingly, it is intended to embrace all such alternatives, modifications, and variations as fall within the spirit and scope of the following claims.

What is claimed:

1. A method of molding a three-layer polymer fuel tank comprising the steps of:

providing an HDPE material;

providing a barrier material, said barrier material comprising a blend of between 1–15% by weight compatibilizer and 99–85% by weight EVOH, said compatibilizer having a polyolefin backbone selected from the group comprising isotactic polypropylene or polyethylene and a functional polymer graft of polycaprolactone; and extruding a three layer laminate having said barrier material between two layers of said HDPE material, whereby said compatibilizer bonds with both said HDPE material and said EVOH to form a strong multi-wall fuel tank resistive to delamination.

2. A method of molding a three-layer polymer fuel tank comprising the steps of:

providing an HDPE material;

providing a barrier material, said barrier material comprising a blend of between 1–15% by weight compatibilizer and 99–85% by weight EVOH, said compatibilizer having a polyolefin backbone selected from the group comprising isotactic polypropylene or polyethylene and a functional polymer graft of polyvinyl acrylate; and extruding a three layer laminate having said barrier material between two layers of said HDPE material, whereby said compatibilizer bonds with botch said HDPE material and said EVOH to form a strong multi-wall fuel tank resistive to delamination.

* * * * *